March 12, 1957 K. G. A. SANKEY 2,784,491
MEASURING INSTRUMENT FOR MAKING GARMENTS
Filed May 12, 1952 7 Sheets-Sheet 1

INVENTOR
KARL G.A. SANKEY
BY Wenderoth, Lind and Ponack
ATTORNEYS

March 12, 1957 K. G. A. SANKEY 2,784,491
MEASURING INSTRUMENT FOR MAKING GARMENTS
Filed May 12, 1952 7 Sheets-Sheet 2
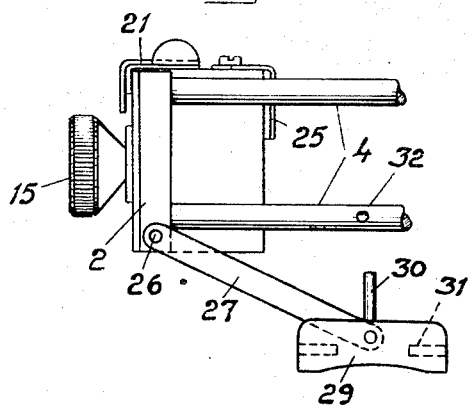
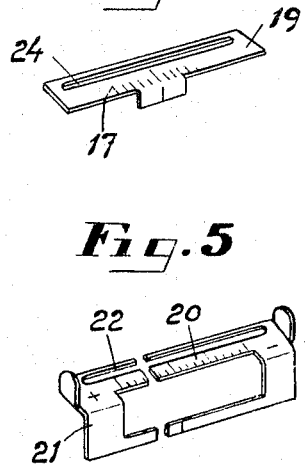
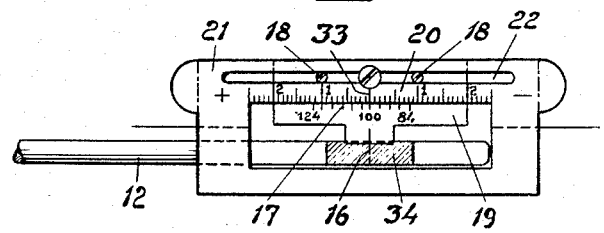
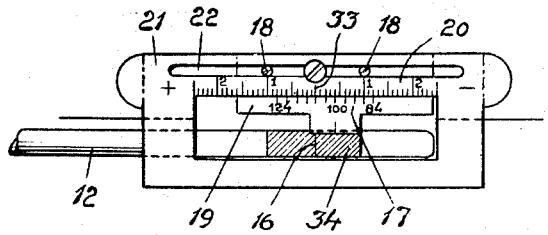
INVENTOR
KARL G. A. SANKEY
BY Wenderoth, Lind and Ponack
ATTORNEYS March 12, 1957  K. G. A. SANKEY  2,784,491
MEASURING INSTRUMENT FOR MAKING GARMENTS
Filed May 12, 1952  7 Sheets-Sheet 3
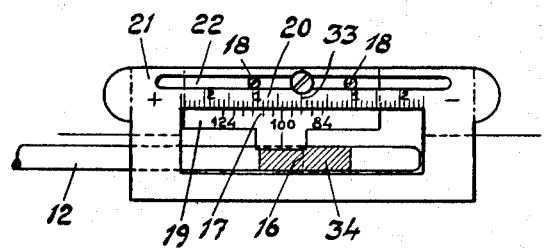
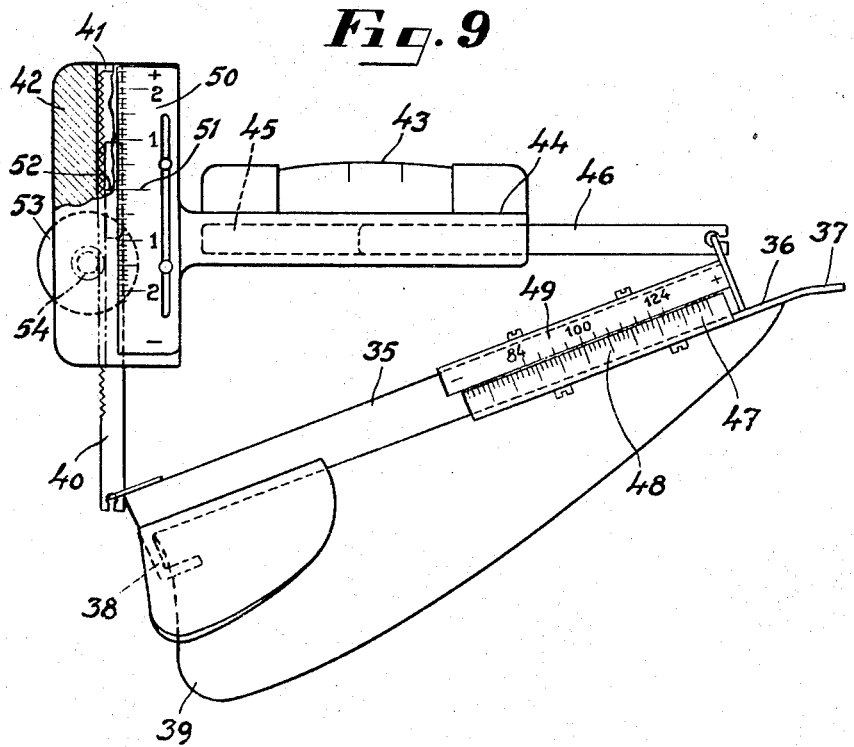
INVENTOR
KARL G. A. SANKEY
BY Wenderoth, Lind and Ponack
ATTORNEYS

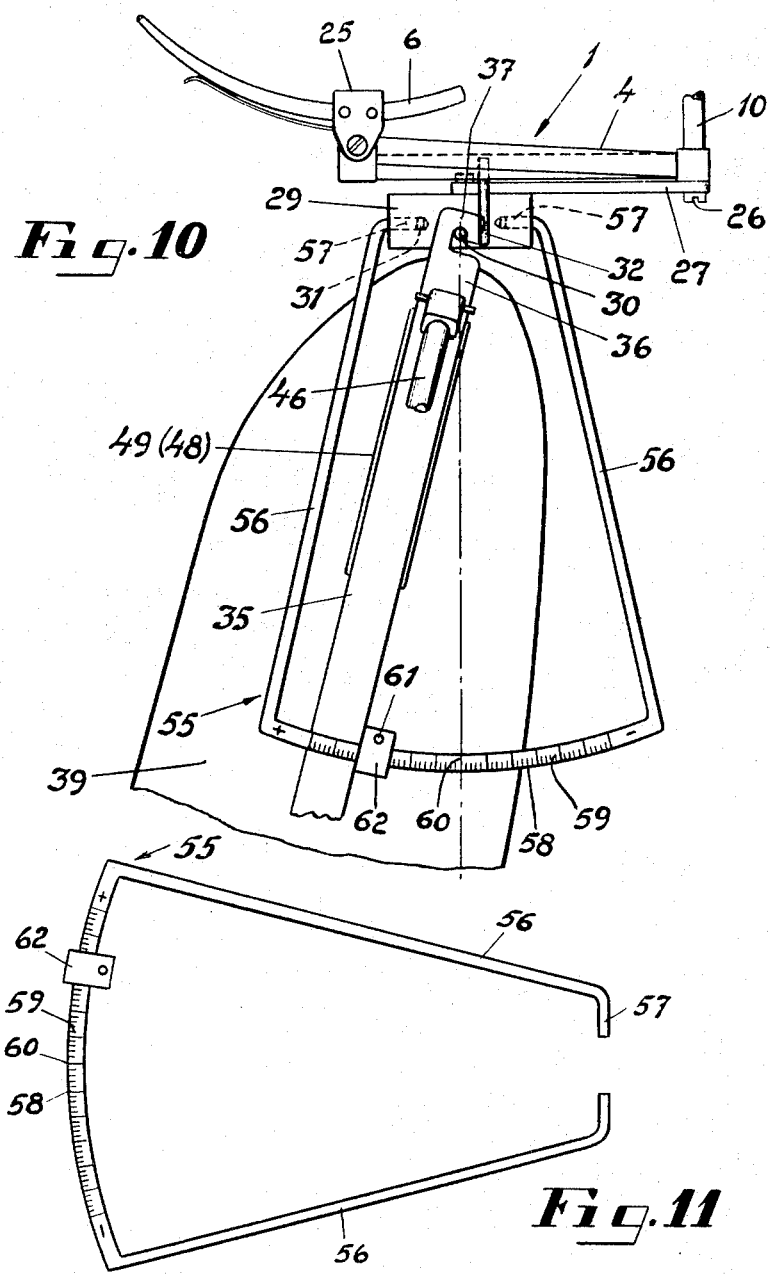

March 12, 1957    K. G. A. SANKEY    2,784,491
MEASURING INSTRUMENT FOR MAKING GARMENTS
Filed May 12, 1952    7 Sheets-Sheet 5

Inventor
Karl G. A. Sankey

March 12, 1957 — K. G. A. SANKEY — 2,784,491
MEASURING INSTRUMENT FOR MAKING GARMENTS
Filed May 12, 1952 — 7 Sheets-Sheet 6
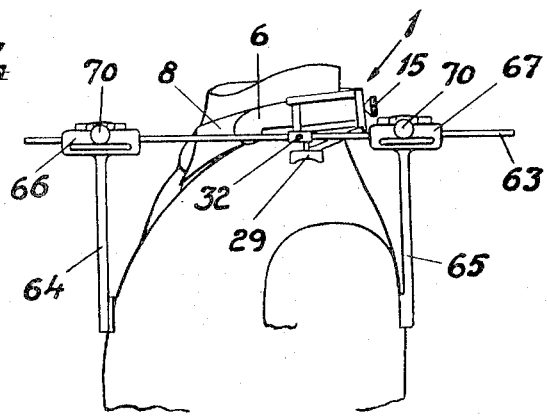
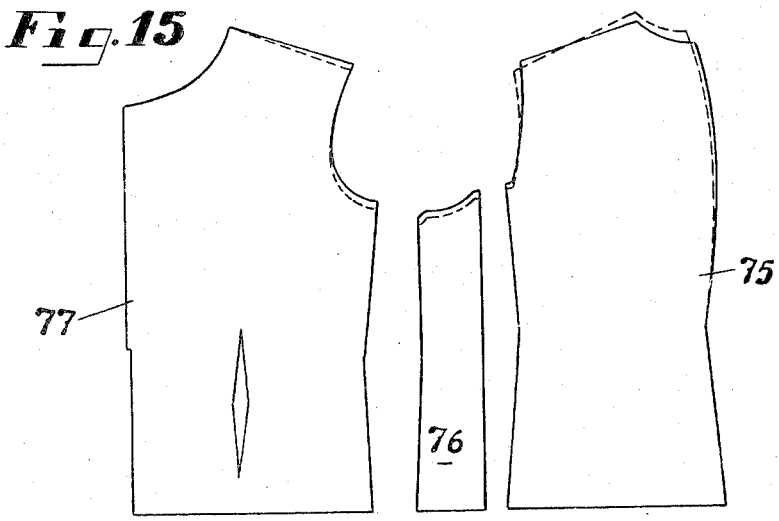
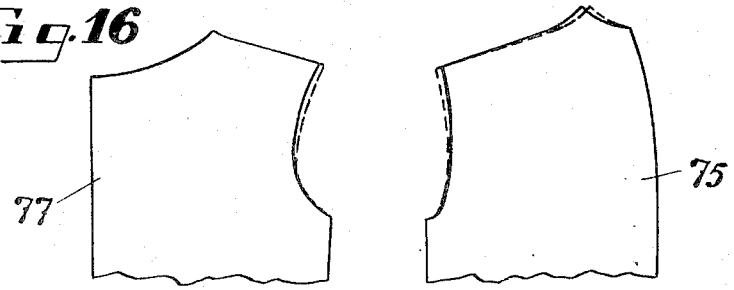

| SANKEY MEASURES | | | |
|---|---|---|---|
| ORDER No. | | | |
| Wide neck + | | Slender neck − | |
| High shoulder, left + | | Low shoulder left − | |
| High shoulder right + | | Low shoulder right − | |
| Wide shoulder + | | Slender shoulder − | |
| Forwards twist. should+ | | Backwards twist. should− | |
| Long back + | | Short back − | |
| High chest + | | Low chest − | |
| All in millimetres | | | |

Inventor
Karl G. A. Sankey
By:
Henkroth, Lind & Ponack
Attorneys.

United States Patent Office 2,784,491
Patented Mar. 12, 1957

2,784,491
MEASURING INSTRUMENT FOR MAKING GARMENTS

Karl Gustav Arne Sankey, Mariestad, Sweden

Application May 12, 1952, Serial No. 287,369

Claims priority, application Sweden May 11, 1951

5 Claims. (Cl. 33—2)

The present invention is based upon the fact that a short coat or a similar garment to feel proper on the body of the wearer must in the first place fit well at the neck, both at the back and the neck as well as at the sides, up to the place where the collar of the garment is draped away from the shirt-collar and continues as the coat lapel. This measurement and fit have formerly been neglected since it was considered sufficient to rely upon the chest measurement. From this measurement, the size of the pattern of the coat has been determined. It has been presumed that when a customer has a certain chest measurement he should have a neck measurement which is proportional to the chest measurement. Even when the circumference of the neck has been measured this has not proved sufficient, since persons with the same circumference of the neck usually have a different shape of neck, resulting in a poor fit. When the customer has a neck which is more slender than he is presumed to have according to his chest measurement, the collar is too long and stands out at the neck. Similarly, when the customer's neck is larger than he is presumed to have according to his chest measurement, the collar is too short and the garment hangs from the neck. This type of improper fitting causes a false judgment of the cutter or the tailor when "chalking" the garment for correction, especially when the error appears in conjunction with, for example, an erroneous measurement of the height of the shoulder or length of the back. The correction of the collar is difficult to accomplish, especially when the collar is too short and the upper part of it is turned after having been sewn in the crotch.

In industrial trailoring in order to measure it is thus necessary to know the diameter of the neck-hole, which the garment shall have in order that a proper fit be made. For this purpose, the measuring instrument which is the object of this invention is provided. The device of the invention measures the neck-hole diameter of the garment, which device preferably consists of two neck embracing parts, the relative positions of which can be read on scales. In order to make it possible to take all the required measurements from the customer, the neck measuring means is combined according to the invention with a device for determining the length and slope of the customer's shoulders, a shoulder measure, a device for determining the height of the chest and back, the chest and back measurer, and preferably also a device for determining whether the shoulders are deviated or twisted in the horizontal plane, i. e., whether the customer has forwardly twisted, backwardly twisted or normal shoulders. The various measuring devices of the instrument are provided with scales constructed and arranged in such a manner that the various measurements may be taken in relation to the corresponding measurement of a normal person with the same chest measure as the customer in question.

In the following the invention is described more particularly and reference is made to the accompanying drawings, which show one embodiment of the measuring device according to the invention.

Figure 1 is a plan view of the neck diameter measuring portion of the instrument.

Figure 2 a back view partly in section, and

Figure 3 a side view of a part of the same.

Figure 4 is a perspective view of a fixed scale plate of the neck diameter measuring portion, and Figure 5 a movable scale plate of the same.

Figures 6–8 show various measuring positions of the neck diameter measuring portion whereby the plates with their scales for clearness are shown with all parts in one plane.

Figure 9 is a front view of a shoulder measuring portion of the device.

Figure 10 is a plan view of that part of the shoulder measuring portion with which the horizontal location of a twisted shoulder can be determined, in measuring position, and Figure 11 is a plan view of said part, separated from the device.

Figure 14 is a side view of the chest and back measuring portion and the neck diameter measuring portion.

Figures 15–17 show some patterns, and

Figure 18 shows an order sheet on which the measurements obtained with the instrument preferably may be noted.

The various portions of the garment measuring device will hereinafter be described separately.

The neck diameter measuring portion

Figure 13:
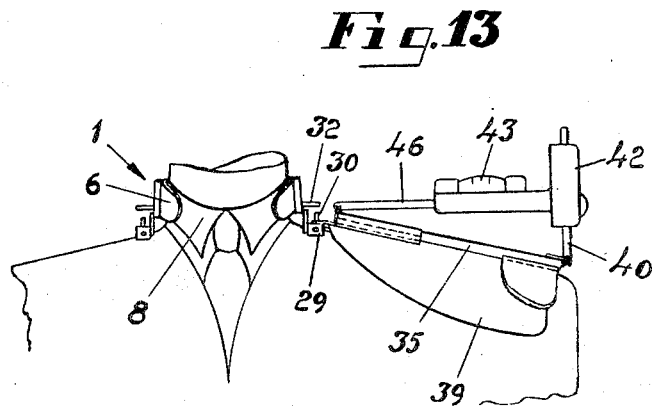
Figure 13 is, to a reduced scale, a front view of the shoulder measuring portion and the neck diameter measuring portion in use.

The neck diameter measuring portion 1 comprises a head part 2 and two L-shaped neck embracing parts 3 slidable relatively to the head part. At the free end of each of two forwardly bent arms 4 of the neck embracing parts 3, an arcuate curved plate 6 is adapted to swivel on a pivot 5 and is, in the measuring position of the instrument, by means of a spring 7, held with the front surface of the plate 6 against the outside of the customer's shirt-collar 8 towards the front part of such collar (Figures 13 and 14). The other arm of each of the neck embracing parts is in the form of two bars, 10 and 11, slidably mounted in holes 12 in the head part 2. One of the bars 10 is plain (preferably cylindrical) while the other one, 11, has a rack with teeth 13 at the free end thereof. The teeth 13 of the two bars 11 mesh with diametrical opposite sides of a cog-wheel 14, rotatably mounted on the head 2, which wheel may be turned in one direction or the other by means of a knob 15. By turning the knob in one direction the arms of the neck embracing parts are displaced towards each other and by turning the knob in the opposite direction they are displaced away from each other. As will be clearly pointed out hereafter, the displacement can then be read by means of an indicating mark 16 on the upper of the two bars 11 and a scale 17, bearing various chest measurements, attached to a plate 19, which is fastened to the head part 2 by screws 18 and a plate 21, provided with a length scale, for example a millimetre scale 20, said plate being slidable longitudinally along the scale 17. The screw heads 18 project into a longitudinal slot 22 in the plate 21 and thus serve as a guide when the plate is moved. The plate 21 is secured to the head part 2 by a screw 23 projecting through the slot 22. Also the fixed plate 19 is provided with a longitudinal slot 24, which makes it possible to set the lateral location of the plate. The head part 2 is provided with two L-shaped, in vertical section, projections 25, fastened to the upper side of it, and each of the neck embracing parts 3 is provided with a similar projection 25 located at the outer end of the arm 4. When using the measurer, the projections 25 rest on the upper part of the customer's shirt-collar 8.

At the corner of each neck embracing part 3 there is an arm 27 with one end fulcrummed over a pivot 26, which at the other end carries a supporting part 29, adapted to swivel on a pivot 28, which supporting part 29 is arranged to be located against the neck-root of the customer at a place where the neck joins into the shoulder. Each supporting part 29 is supplied with an upstanding pin 30, on which the shoulder measuring portion can be hooked. The supporting parts 29 are also provided with two co-axial holes 31. Finally each neck embracing part 3 is provided with a horizontal pivot for fitting the chest and back measuring portion in position for use.

When the device is adjusted for a normal figure with a chest width of 100 cm. there is a certain distance between the curved plates 6, which distance is indicated by the scale 17 on the fixed scale plate 19 and the position of the bar 11, as Figure 6 shows.

For each chest measure intermediate 84 and 124 cm. there is on the scale an indicating mark which corresponds to the neck-hole diameter of the pattern and which varies with 2 mm. for each size. If by measuring all these chest widths one finds that the index mark 16 of the bar 11 at each chest measure moves a move of one position along the fixed scale, no alteration is to be made in the normal pattern. If, however, this does not occur, the scales may register in the position shown in Figure 7. After the application of the neck diameter measuring portion to the shirt-collar and after the plates 6 are pressed against the outside of the shirt-collar by turning the knob 15, the bar 11 takes the position shown in this figure, the user displaces the movable plate 21 in such a manner that the zero mark 33 on its scale 20 appears over the mark 16 of the bar 11. Then the distance in mm. intermediate the zero mark 33 and the chest measure, in the example 100 cm., is read on the scale 17.

From Figure 7 it will be seen that this distance in the example is about 4 mm. The scale 20 of the movable plate 21 is provided with a plus sign on its left hand side and a minus sign on its right hand side, which means that if the mark 16, which preferably may be applied on a red portion of the bar 11, and also the zero mark 33 of the scale 20 will be located on the left hand side of the chest measure in question, indicated on the scale 17, the neck-hole diameter is as many mm. wider than the corresponding diameter of the normal pattern as the scale 20 indicates, i. e. in the example plus 4 mm. when the chest measure is presumed to be 100 cm. If the mark 16 and also the zero mark 33 had appeared at the same distance from the 100 mark of the scale 17 to the right of said mark after the displacement of plate 21 this would have resulted in minus 4 mm., shown for example in Figure 8. From the preceding it will be seen that it is possible, when the chest measure of the customer is known, to decide by use of the measuring device whether the customer has a normal (plus), wider, or (minus) smaller neck diameter than the neck diameter of a normal person with the same chest measure as the customer, as well as the real difference. The measurement is noted in the order blank 18 shown in Figure 18 as "wide neck" or "slender neck." This measure can be used directly by the cutter.

*The shoulder measuring portion*

As important as the correct neck diameter is that the shoulders of the garment are of proper height in relation to the collar. A shoulder in the garment of a person which slopes too much results in an unpleasant feeling and a very disfiguring crease across the back under the collar, and a shoulder of a garment which is too high causes disfiguring and uncomfortable creases in the side parts.

In a garment for a person whose shoulders slope too much it is not always desirable to let the garment follow the shoulder, for which reason it is in many cases advisable to apply extra wadding in the shoulders, but it is of course best to know the amount of wadding necessary. Correction of an error in the shoulder height can of course by done by applying waddings, but only to a certain limit. Beyond this limit this way of making alterations results in defects in other parts of the garment, for example in creases across the back and the neck and arm holes that are too small. It might also be necessary to open the seans of the arm and cut the arm-hole out, with the result that creases over the shoulder often may occur depending on whether the angle at the outer part of the shoulder is dislocated. If the shoulder of the garment is too low there may also be transverse creases at the collar. In such a case the collar has to be cut off to shorten the back at the neck. By using the shoulder measuring portion of the device according to the invention the slope and width of the shoulder may be measured exactly in relation to the corresponding measures of a normal person. As hereinafter will be described this measurer may include a device for determining the horizontal dislocation of the shoulder, i. e. whether the customer has forwardly twisted, backwardly twisted or normal shoulders.

As shown in Figure 9 the shoulder measuring portion is supplied with two bars 35 and 36, which are longitudinally slidable in relation to each other. One of these bars 36 is provided at its free end with a notch 37 by aid of which the portion may be detachably hooked on the upstanding pin 30 of the supporting part 29. The other bar 35, which on its underside is provided with a shoulder pad 39 with its outer part having a hook-like projecting part 38, is at its outer end pivotally connected to the lower part of an upstanding rack bar 40. This bar 40 is slidably mounted in a hole 41 in a head part 42 on a beam 44, provided with a spirit level 43. Another bar 46, which at its free end is hinged to the inner side of the bar 35, is slidably mounted in hole 45 of the beam 44. The bar 36 is provided with a length scale 47 graduated in mm. on each side of a zero mark. The bar 35 is supplied with a scale 49, indicating various chest measurements for normal persons. The head part 42 is provided with a length scale 50 on each side of a zero mark 51. The bar 40 bears an index mark 52.

The movable arm 27 of the neck diameter measuring portion 1 is swung downwardly so that the supporting part 29 is pressed against the neck root. Then the shoulder measuring device is placed on the shoulder of the customer with the notch 37 hooked on the pin 30 (Figure 13). The hook-formed part 38 rests on the outer end of the shoulder and as a consequence thereof the bar 35 will follow the upper line of the shoulder. The bar 35 is displaced a distance such that the hook-formed part 38 and the outer end of the shoulder pad 39 will be located at the outer end of the shoulder. A toothed wheel 54, mounted in the head part 42 meshes with the teeth of the bar 40, the toothed wheel being turned in one direction or the other by the knob 53, whereby the head part with the relatively slidable parts 44 and 46 is swung upwardly about the joint at the end of the bar 46. The knob 53 is turned until the bar 44 is horizontal, which is indicated by the spirit level 43.

The location of the index mark 52 of the bar 40 can be read on the scale 50. The position shown in Figure 9 indicates a normal shoulder as the index mark 52 is in register with the zero mark 51. If the index mark is located above, i. e. on the plus side of the zero mark 51, the customer has a high shoulder. If it appears below, i. e. on the minus side of the zero mark 51, the customer has a sloping shoulder. The measure read on the scale 50 in mm. is noted on the order blank shown in Figure 18 when the heights of the left and the right shoulder have been measured, under "high shoulder left" or "low shoulder left" and "high shoulder right" or "low shoulder right." These measurements may be used directly by the cutter for making alterations to the pattern for a normal person with the same chest measurements as that of the customer. The length of the customer's shoulders has seldom been measured formerly. Generally it is not necessary since to a large extent it is possible to base it upon the measurements of the chest width and the width of the back. If a customer, however, has a very large or very slender neck and for the rest has a normal width of the back in relation to his chest width, the length of the shoulders may reasonably be smaller or longer. On the shoulder measuring portion according to the invention the difference between the shoulder length of the customer and the shoulder length of a normal person with the same chest measurement may be read on the scale 47. In the example shown in Figure 9, the zero mark 48 of the scale 47 is located on the plus side of the chest width 100 cm., which is the chest width stated in our example. The customer has in this case a shoulder about 5 mm. longer than normal. The measurement is noted on the order blank under "wide shoulder."

In order to avoid reading the instrument while it is on the customer, two shoulder measuring portions may be provided on the measuring device, one for each shoulder.

The shoulder twist measuring portion

Sometimes it occurs that a customer who is full chested has shoulders which are markedly back twisted. On the contrary, it might occur that a person with a long back has markedly forward twisted shoulders. If when measuring the height and length of the shoulders the same seem to be markedly forwards or backwards twisted, the measuring portion of the device shown in Figures 10 and 11 is used. This consists of a wire bow 55 with two resilient shanks 56, the free ends of which are bent in a direction towards each other, thus forming two co-axial pivots 57, which due to the resilience of the material can be sprung apart to enter into the holes 31 in the supporting part 29 of the neck diameter measuring portion. The part 58, which connects the shanks, consists of an arcuate beam with a length scale 59 on each side of a zero mark 60. Along the beam 58, a slide 62, provided with a catch arrangement 61, is slidably mounted, As the beam 35 (Figure 10) of the shoulder measuring portion follows the highest line of the customer's shoulder, it is possible to get a measure of the twist of the shoulder in the horizontal plane compared with that of a normal person by reading the position of said beam 35 on the beam 58, compared to the zero mark 60 of the scale 59.

If the obtained measure is plus, the costumer has forwardly twisted shoulder and if it is minus he has backwardly twisted shoulder. The obtained result is noted on the order blank under "forwardly twisted shoulder" or "backwardly twisted shoulder."

The chest and back measuring portion

In using the length of the back, tailors have formerly in most instances neglected the height of the chest and taken for granted that if the back is, for instance, 2 cm. higher and the parts of the back as a consequence thereof proportionately longer than normal, the chest will be 2 cm. smaller and the front parts of the garment proportionately shorter. It is however very seldom that the circumstances are as mentioned. If the shape of the body has been judged in this simple manner, the garment often has to be altered. Correction of such errors can be very expensive, as the whole back part has to be ripped apart, since it is too short or too long. If the front part is too short and must be lengthened an alteration is practically impossible to make, as the collar of the garment must be lengthened too.

With the chest and back measuring portion according to the invention it is possible to determine the height of the customer's chest and height of the back in relation to the height of the chest and back of a normal person with the same chest measurements as the customer. The measurements start from a certain point at the neck-root of the costumer, i. e. the horizontal pivot 32 of the neck-hole diameter measuring portion, which pivot is located at the inner part of the shoulder. The distance from this pivot to the highest point of the chest and to the highest point of the back, that is the shoulder-blade, are measured.

Figure 1:
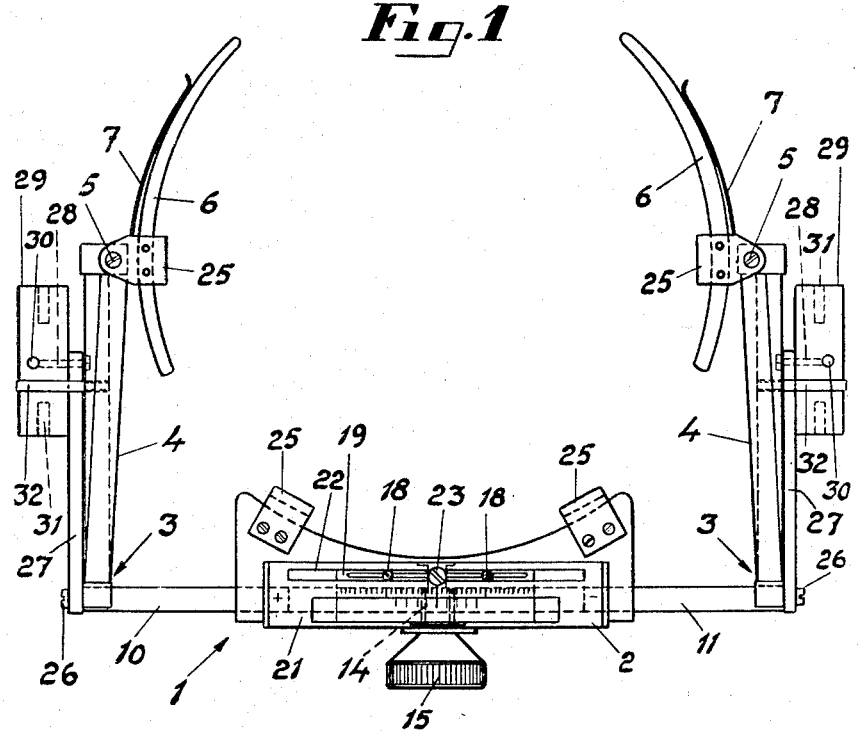
Figure 2:
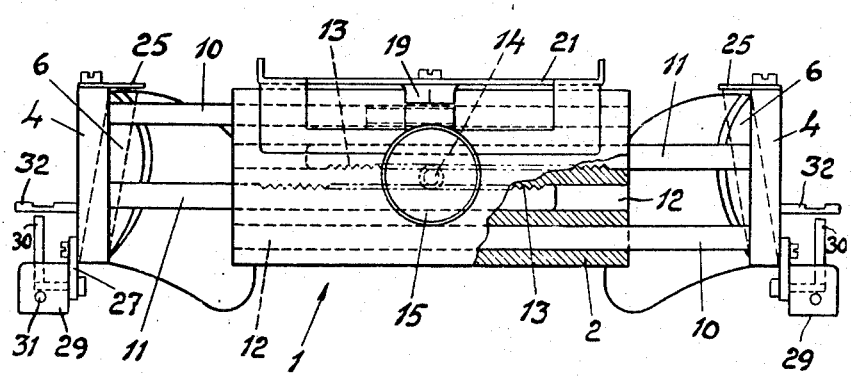
Figure 12:
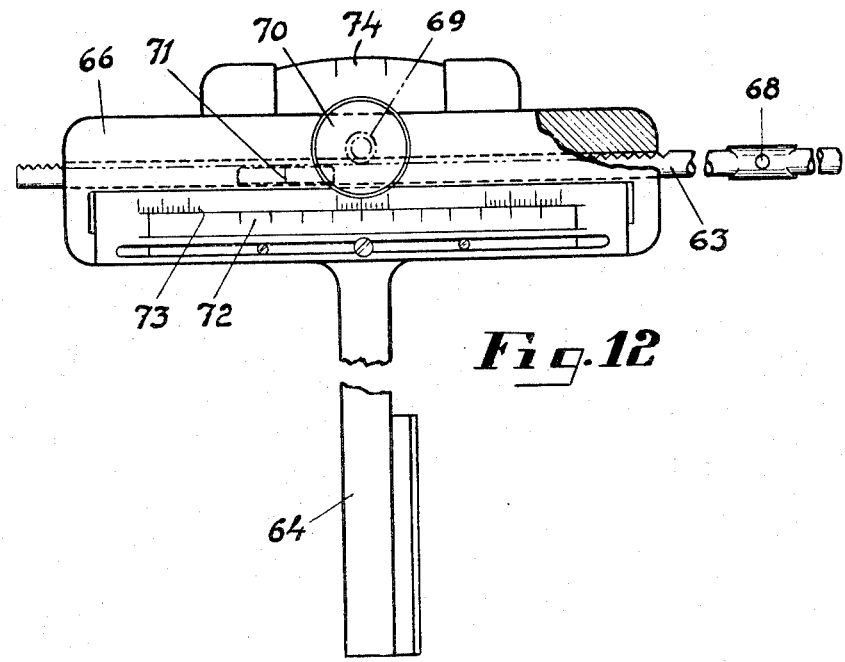
Figure 12 is a partly broken side view of one of the body members of the chest and back measuring portion.

The chest and back measuring portions (Figures 12 and 14) consist of a rod 63, which is hooked on the horizontal pivot 32 of the neck-hole diameter measuring portion and two head parts 66, 67 with downwardly directed arms 64, 65, said head parts being slidably mounted on each end of the rod. The rod 63 has at its centre a hole 68, which in the operating position of the portion can be engaged on the pivot 32. The rod is provided with teeth forming racks at either end thereof which mesh with a toothed wheel mounted in each of the head parts 66, 67, and each toothed wheel is rotated by a knob 70. At each end, the rod 63 is provided with an index mark 71. Each head part 66, 67 is provided with a stationary scale 72, giving the sizes for the width of the chest for various normal persons and a longitudinally slidable length scale 73. The head 66 includes also a spirit level 74.

In a manner similar to the one described in conjunction with the instrument above it is possible to determine whether and how much the costumer's height of chest and length of back differ from the height of the chest and the length of the back of a normal person with the same chest width as the customer, by sliding the arms 64, 65 until they rest against the chest and back, by turning the knob 70 and by reading the position of the index mark 71 in relation to the scales 72 and 73. The measurements obtained are noted on the order blank under "long back" and "short back" and "high chest" and "low chest."

Figures 17, 18:
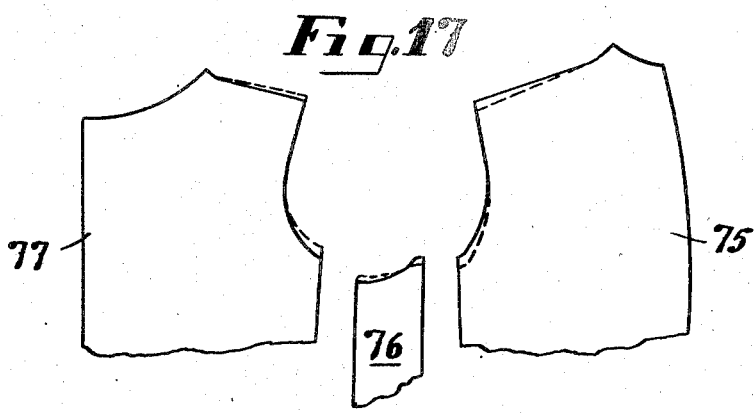

With the order sheet, the cutter can quite easily and in a manner well-known to a man skilled in the art, make alterations in the pattern for a normal person with the same chest width as the customer. In Figures 15–17 some patterns for a normal person are shown in full lines. The alterations which have to be made of the back part 75, the side part 76 and the front part 77 of the garment are shown in dotted lines. In Figure 15 a pattern for a customer who has a long back and a low shoulder in relation to the normal person with the same chest width, is shown.

From Figure 16 it will be seen that it has been necessary to make alterations on the back piece 75 and the front piece 77 of the normal pattern shown, because of the fact that the customer has a slender neck and a long shoulder in relation to the normal person. In Figure 17, finally, are shown some alterations of the back piece 75, the side piece 76 and the front piece 77, which have been necessary to make, because the customer has a forwardly twisted shoulder. How the pattern is to be altered in accordance with all the measurements, noted on the sheet is well known to a person skilled in the art, and is therefore not described.

The embodiment, shown and described in the foregoing is given by way of example and the construction of the various details of the measuring instrument may be changed in various ways within the scope of the following claims. The arm 27 of the neck diameter measuring portion can be arranged slidably in longitudinal direction whereby it will be possible to always place the supporting part 29 in such a manner that the pin 30 stands up exactly from the highest point of the shoulder. The arm 27 may possibly have substituted therefor a slide vertically displaceable on the arm 4, carrying at its lower end a pivot 28, on which the supporting part 29 may be pivoted. The wire bow 55 for measuring of the twist of the shoulders in the horizontal plane may have a construction other than that shown in the drawings. It might possibly be pivoted directly to the embracing part 3 of the neckhole diameter measurer. In many cases it could be omitted.

What I claim is:

1. A measuring device for taking measurements for making tailored to measure coats and the like from coats and the like cut to a standard pattern, comprising a neck measuring portion comprising a head part adapted to be seated on a person's shoulders behind a shirt collar, two neck embracing parts slidably mounted in said head part, one extending forwardly from each end of said head part, and each having a curved plate thereon adapted to fit against a shirt collar, two arms pivoted to the ends of said neck embracing parts adjacent said head part extending to the point at which the shirt collar joins the center line of a shoulder, and means on said head piece to indicate the positions of said neck embracing parts when said neck embracing parts embrace the neck of a size based on a given chest measurement and to indicate variations of the position of said neck embracing parts from said size, a pair of shoulder measuring portions each comprising two attached lengths measuring bars slidable relative to each other, means on said bars to indicate the length of said bars when they lie along a shoulder of a size based on a given chest measurement and to indicate variations of the length of said bars from said size, a vertical support pivoted to the free end of one of said bars, a shoulder head part slidable on said support, a level extending perpendicular to said support from said shoulder head part, an extension slidable on said level pivotally connected to the free end of the other of said bars, means on said shoulder head piece to indicate the height of said level above the end of a shoulder based on a given chest measurement and to indicate a variation of said height of said level, said shoulder measuring portion hooked to the end of said arms adjacent the point where the shirt collar joins the center line of the shoulders, and a chest and back measuring portion comprising a rod portion with its center at the end of one of said arms adjacent the point where a shirt collar joins the center line of the shoulders and projecting horizontally in a direction perpendicular to the center line of the shoulders, and front and rear head portions each slidably mounted on said rod and having a measuring arm extending downwardly therefrom, and means on said head parts to indicate chest height and back height based on a given chest measurement and to indicate variations therefrom, whereby variations in neck size, shoulder length and level and chest and back height from measurements based on a given chest measurement can be measured simultaneously.

2. A measuring device as claimed in claim 1 and a shoulder twist measuring portion on said shoulder measuring portion comprising a wire bow having two resilient shanks, the free ends of which are bent towards each other, pivoted to the end of one of said arms at the point on the shirt collar at the center line of the shoulders, and means on said bow to measure variations from normal of the twist of the shoulder in the horizontal plane.

3. In a measuring device for taking measurements for making tailored to measure coats and the like from coats and the like cut to a standard pattern, a neck measuring portion comprising a head part adapted to be seated on a person's shoulders behind a shirt collar, two neck embracing parts slidably mounted in said head part, one extending forwardly from each end of said head part, and each having a curved plate thereon adapted to fit against a shirt collar, two arms pivoted to the ends of said neck embracing parts adjacent said head part extending to the point at which the shirt collar joins the center line of a shoulder, and means on said head piece to indicate the positions of said neck embracing parts when said neck embracing parts embrace the neck of a size based on a given chest measurement and to indicate variations of the position of said neck embracing parts from said size.

4. In a measuring device for taking measurements for making tailored to measure coats and the like from coats and the like cut to a standard pattern, a pair of shoulder measuring portions each comprising two attached lengths measuring bars slidable relative to each other, means on said bars to indicate the length of said bars when they lie along a shoulder of a size based on a given chest measurement and to indicate variations of a length of said bars from said size, a vertical support pivoted to the free end of one of said bars, a shoulder head part slidable on said support, a level extending perpendicular to said support from said shoulder head part, an extension slidable on said level pivotally connected to the free end of the other of said bars, means on said shoulder head piece to indicate the height of said level above the end of a shoulder based on a given chest measurement and to indicate a variation of said height of said level.

5. In a measuring device for taking measurements for making tailored to measure coats and the like from coats and the like cut to a standard pattern, a chest and back measuring portion comprising a rod portion with its center adjacent the point where a shirt collar joins the center line of the shoulders and projecting horizontally in a direction perpendicular to the center line of the shoulders, and front and rear head portions each slidably mounted on said rod and having a measuring arm extending downwardly therefrom, and means on said head parts to indicate chest height and back height based on a given chest measurement and to indicate variations therefrom.

References Cited in the file of this patent

UNITED STATES PATENTS

| Number | Name | Date |
|---|---|---|
| 457,124 | Liebl | Aug. 4, 1891 |
| 977,177 | Fellowes | Nov. 25, 1910 |
| 1,218,565 | Kaeser | Mar. 6, 1917 |
| 1,268,084 | Berriman | June 4, 1918 |
| 1,445,301 | Delmonaco | Feb. 13, 1923 |
| 1,612,385 | Lopez | Dec. 28, 1926 |
| 1,763,091 | Cangemi | June 10, 1930 |
| 1,784,888 | Couture | Dec. 16, 1930 |
| 2,254,041 | Lein et al. | Aug. 26, 1941 |
| 2,624,943 | Booth | Jan. 13, 1953 |

FOREIGN PATENTS

| 153,908 | Germany | July 25, 1938 |
| 662,958 | Great Britain | Dec. 12, 1951 |